(12) United States Patent
Wrobbel

(10) Patent No.: US 6,517,766 B1
(45) Date of Patent: Feb. 11, 2003

(54) METHOD FOR THE PRODUCTION OF COMPONENTS COATED WITH A DECORATIVE MATERIAL

(75) Inventor: Werner Wrobbel, Gütersloh (DE)

(73) Assignee: Moeller Plast GmbH, Bielefeld (DE)

( * ) Notice: Subject to any disclaimer, the term of this patent is extended or adjusted under 35 U.S.C. 154(b) by 0 days.

(21) Appl. No.: 09/472,217

(22) Filed: Dec. 27, 1999

(30) Foreign Application Priority Data

Dec. 24, 1999 (DE) .......................................... 198 60 199

(51) Int. Cl.⁷ ............................................... B29C 49/22
(52) U.S. Cl. ..................... 264/512; 264/514; 264/516
(58) Field of Search ............................... 264/516, 512, 264/514, 534

(56) References Cited

U.S. PATENT DOCUMENTS

| | | | |
|---|---|---|---|
| 5,194,305 A | 3/1993 | Shirahata et al. | |
| 5,804,127 A | 9/1998 | Takatori et al. | |
| 6,318,988 B1 | * 11/2001 | Wrobbel | 425/346 |

FOREIGN PATENT DOCUMENTS

EP 0738580 A1 * 10/1996

* cited by examiner

Primary Examiner—Suzanne E. McDowell
(74) Attorney, Agent, or Firm—Laurence A. Greenberg; Werner H. Stemer; Ralph E. Locher

(57) ABSTRACT

A method for the blow molded production of double-walled components coated with a decorative material includes pressing an extruded plastic tube together with a decorative material into a component and simultaneously creating a pinched region on the component at the die separation region, placing the pinched region at a distance from the component side edge by displacing the die separation region, preferably with a slide, and, after the component is removed from the die, connecting a decorative material to the component around the side edge. Also provided is a blow molding die for performing the method. The die includes first and second die halves defining a die separation region therebetween, a slide disposed at the die separation region, movable in longitudinal and transverse directions with respect to the die separation region. The slide has an end face forming a portion of the inner contour that produces the edge region of the component, a first face bearing against the first die half and/or a projecting end of the decorative material, and a second face directed towards the second die half and forming with the second die half a pinching gap located away from the edge region of the component, the pinching gap forming the pinched region of the component and receiving a waste slug produced and detached at the pinched region.

14 Claims, 1 Drawing Sheet

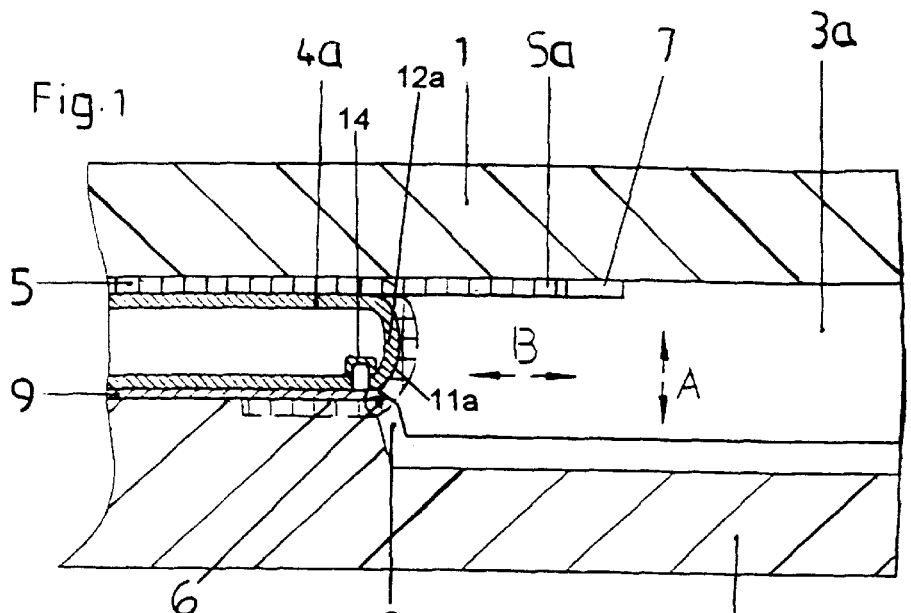
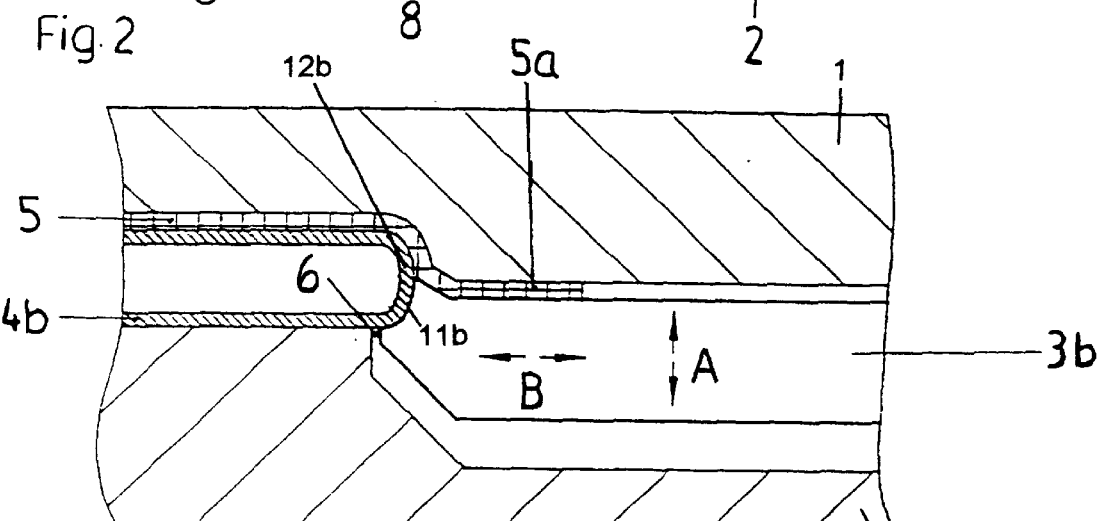
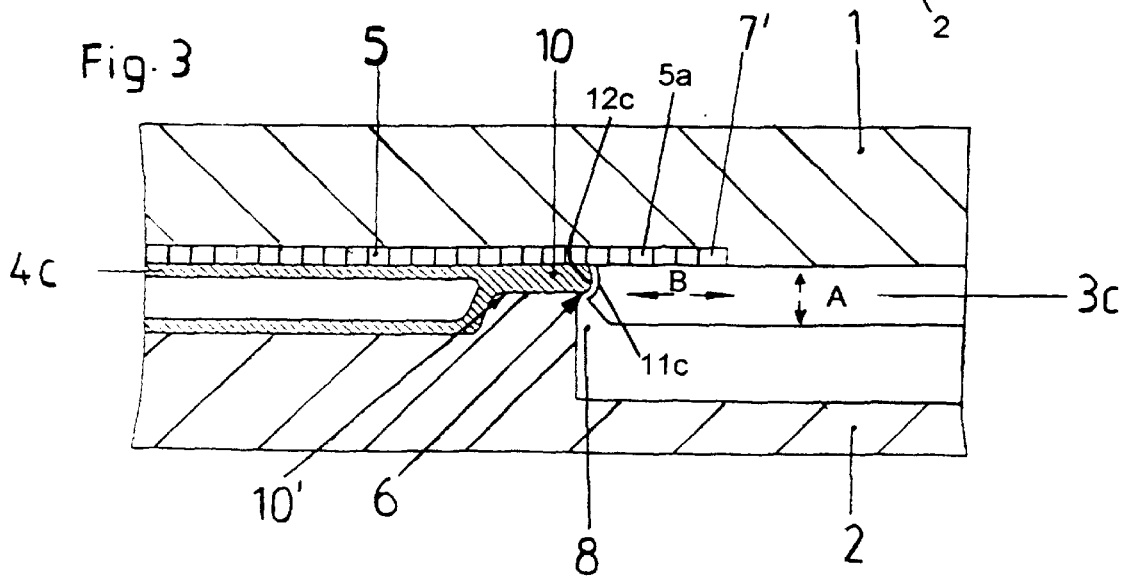

METHOD FOR THE PRODUCTION OF COMPONENTS COATED WITH A DECORATIVE MATERIAL

BACKGROUND OF THE INVENTION

FIELD OF THE INVENTION

The invention lies in the field of blow molding manufacturing. The invention relates to a method for the blow molded production of double-walled components coated with a decorative material. In a blow molding die having a die separation formed between two die halves, a freshly extruded plastic tube, together with the decorative material, is shaped according to the die inner contour by blown air. The invention also relates to a blow molding die for carrying out the method.

Blowing methods have been used for a long time to produce hollow bodies, such as bottles, containers and the like, and have also proved appropriate in the manufacture of flat double-walled components, such as, for example, rear shelves, sun visors, dashboards, and consoles in the automobile industry. The double-walled configuration of such components serves to provide ducts and other cavities while ensuring sufficient rigidity.

In such double-walled components, the blow molding operation creates a pinched region near the separating line between the two die halves (the die separation region). During subsequent component finishing in the pinched region, the decorative material adhering thereto is damaged. Where the pinched region is part of the outer contour and is in a location on the component that is visible when in the installed state, the blow molded component does not meet the visual or textural requirements. If there are dimensional tolerances along the pinched region, either too much of the pinched region is cut, thus cutting the decorative material adhering thereto, or not enough of the material is cut off at the pinched edge, thus leaving an undesired pinched part that does not satisfy visual and textural requirements.

SUMMARY OF THE INVENTION

It is accordingly an object of the invention to provide a method and a corresponding blow molding die for the production of double-walled, essentially flat components coated with a decorative material that overcomes the hereinafore-mentioned disadvantages of the heretofore-known devices and methods of this general type and that produces a high quality decorative coating which satisfies the most stringent visual and textural requirements, even in the component edge defined by the die separation. The object is achieved, according to the invention, by displacing the die separation region. Thus, the pinched region is transferred into a component wall portion distant from the side edge of the component and adjoining the component, and the decorative material is connected to the component around the side edge.

With the foregoing and other objects in view, there is provided, in accordance with the invention, a method for the blow molded production of double-walled components coated with a decorative material, including the steps of pressing, by blown air in a blow molding die having a die separation region formed between two die halves, a freshly extruded plastic tube together with a decorative material into a component having a shape corresponding to a die inner contour and a side edge and creating a pinched region of the component at the die separation region, placing the pinched region 6 into a component wall portion adjoining the component at a distance from the side edge of the component by displacing the die separation region, and connecting a decorative material to the component around the side edge.

As a result, double-walled blow molded components can be created which have on their side edges a decorative coating of fabric, leather, plastic film and the like, the decorative coating not being impaired by the pinched region or the subsequent working of the component. As such, the component fully satisfies the aesthetic and textural requirements placed on high-quality double-walled components. Preferably, the pinched region is transferred into a region that is not visible when a component is in the installed state. The decorative material may be integrally formed as far as the pinched region or can be pinched off there. The edge of the decorative material equally may be countersunk in a groove in the component wall or be cut off flush with the edge of the component or of the contiguous end of a further decorative coating.

In accordance with another mode of the invention, the pinched region is placed at a component portion not visible when the component is in the installed state.

In accordance with a further mode of the invention, the placing step is performed by placing the pinched region with a slide movable in the die separation region.

In accordance with an added mode of the invention, the decorative material is integrally formed to the pinched region.

In accordance with an additional mode of the invention, the decorative material is pinched off at the pinched region.

In accordance with yet another mode of the invention, the decorative material is countersunk in a groove of the component wall.

In accordance with yet a further mode of the invention, the decorative material is cut off flush with the side edge of the component.

In accordance with yet an added mode of the invention, the decorative material is cut off flush with an edge of a further decorative surface on the component.

In a further mode of the invention, during blow molding the decorative material is integrally formed only partially or not at all onto the side edge of the double-walled component, and, instead, a projecting end of the decorative material is held within the die separation or between the slide and one die half and, after the blow molding has been removed from the die, the projecting end is folded around the side edge and subsequently connected to the surface of the component. The folded-around portion of the decorative material may then be detached at the pinched region, or at the edge of the component or of a contiguous second decorative material.

In accordance with yet an additional mode of the invention, the pressing step includes projecting an end of the decorative material beyond the side edge of the component, holding the end between a die half and the slide resting against the die half and, after removing the slide from the die, laying the projecting end around the side edge of the component and connecting the projecting end to the component.

In accordance with again another mode of the invention, the pressing step includes integrally forming the projecting end of the decorative material onto a part of the side edge of the component.

In accordance with again a further mode of the invention, the laying step is performed by overlapping a folded-round end of the decorative material onto the pinched region, and further includes securing a second decorative material to the pinched region of the component.

In accordance with again an added mode of the invention, the laying step is performed by overlapping a folded-round end of the decorative material onto the pinched region, and further includes detaching a second decorative material at the butting point.

In accordance with again an additional mode of the invention, the laying step is performed by overlapping a folded-round end of the decorative material onto the pinched region, and further includes detaching a second decorative material at the pinched region.

In a further mode of the invention, the edge region of the component may also be molded, between the two die halves, as a one-piece wall portion pressed together. After removal from the die, the projecting end of the decorative material is folded around the wall portion, which forms a concealed edge.

In accordance with still another mode of the invention, the side edge of the component is pressed between the two die halves to form a wall portion having a concealed edge, and, after removing the component from the die, the projecting end of the decorative material is folded around the wall portion and secured to the wall portion at the concealed edge.

With the objects of the invention in view, there is also provided a blow molding die having an inner contour for producing, by blow molding, a double-walled component coated with a decorative material, the material having a projecting end, and the component having an edge region and a pinched region, the die including, first and second die halves defining a die separation region therebetween, a slide disposed at the die separation region, movable in longitudinal and transverse directions with respect to the die separation region, and having an end face partially forming a portion of the inner contour that produces the edge region of the component, a first face sealingly bearing against one of the group consisting of the first die half and the projecting end of the decorative material, and a second face directed towards the second die half and forming with the second die half a pinching gap located away from the edge region of the component, the pinching gap forming the pinched region of the component and receiving a waste slug produced and detached at the pinched region.

The blow molding die according to the invention for carrying out the method includes a slide that is movable in the longitudinal and transverse direction in the die separation. The slide has a first slide face pointing toward the first (upper) die half that sealingly bears on the first die half and/or the projecting end of the decorative material, an end face completely or partially forming the inner contour of the blow molding die in the edge region of the double-walled component, and a second slide face directed toward the second (lower) die half. The second slide face and the second die face provide a pinching gap located outside the edge region of the double-walled component to form the pinched region of the blow molded component and to receive a waste slug detached from the component at the pinched region.

In accordance with another feature of the invention, the decorative material has a projecting end and the slide includes a recess for receiving the projecting end.

In accordance with a further feature of the invention, the decorative material has a projecting end, the first die half has a die half inner contour directed towards the second die half, and the first die half has a recess on the die half inner contour for receiving the decorative material and the projecting end.

In accordance with an added feature of the invention, the pinching gap runs substantially perpendicular to the die separation region.

In accordance with an additional feature of the invention, the end face completely forms the portion of the inner contour that produces the edge region of the component.

In accordance with a concomitant feature of the invention, the first face sealingly bears against the first die half and the projecting end of the decorative material.

Other features which are considered as characteristic for the invention are set forth in the appended claims.

Although the invention is illustrated and described herein as embodied in a method and blow molding die for the production of components coated with a decorative material, it is nevertheless not intended to be limited to the details shown, because various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

BRIEF DESCRIPTION OF THE DRAWINGS

FIG. 1 is a partially cut away diagrammatic, side elevational view of a separation region of a blow molding die according to the invention, the die containing a double-walled component to be coated with a decorative material on both sides, and a slide for transferring the pinched region and for holding the decorative material end;

FIG. 2 is a partially cut away diagrammatic, side elevational view of a variant of the die according to FIG. 1 for coating a component on one side with the decorative material being integrally formed partially onto the side edge of the component during the blow molding operation; and FIG. 3 is a partially cut away diagrammatic, side elevational view of a variant of the die according to FIG. 1 with the component edge region being pressed to form a one-piece wall.

DESCRIPTION OF THE PREFERRED EMBODIMENTS

In all the figures of the drawing, sub-features and integral parts that correspond to one another bear the same reference symbol in each case.

Referring now to the figures of the drawings in detail, there is shown an upper (first) die half 1 and the lower (second) die half 2. In each case of FIGS. 1 to 3, the blow molding die 1, 2 is in the closed position. A slide 3a, 3b, 3c movable in a transverse direction (indicted by the arrows A) and in a longitudinal direction (indicated by the arrows B) is disposed in the region of the die separation. Between the two die halves 1, 2 is a double-walled component 4a, 4b, 4c which is produced from an extruded plastic tube by blow molding. Two walls of the double-walled component 4a, 4b, 4c are delimited by the inner contour of the two die halves 1, 2, and the side edge 12a, 12b, 12c of the double-walled component 4a, 4b, 4c is delimited by the end face 11a, 11b, 11c of the slide 3a, 3b, 3c.

The double-walled component 4a, 4b, 4c is coated, at least in a visible part, with a decorative material 5. The decorative material 5 is configured such that it satisfies the most stringent visual and textural requirements of the double-walled component 4a, 4b, 4c even in the pinched region 6 formed along the separation of the two die halves 1, 2.

To accomplish this, the pinched region 6 is transferred away from the side edge 12a, 12b, 12c of the double-walled component 4a, 4b, 4c. The slide 3 is configured and placed into the die separation such that the pinched region 6 is transferred into a part no longer visible when the component is in the installed state, for example, onto the lower component wall adjoining the side edge 12a, 12b, 12c. Second, the slide 3 serves for retaining a projecting end 5a of the decorative material 5 between the slide 3 and the upper die half 1. As shown in FIGS. 1 and 3, respectively, the projecting end 5a of the decorative material 5 may be received, during the blowing operation, in a recess 7 of the slide 3a or in a recess 7' of the upper die half 1. Moreover, in the transverse direction of the separation, the slide 3 is moved so closely to the upper die half 1 or the projecting end 5a of the decorative material 5 that no material of the blow molded plastic tube (component 4a, 4b, 4c) can enter therebetween. Finally, the end face 11a, 11b, 11c of the slide 3 also serves for imparting the uniformly rounded shape of the side edge 12a, 12b, 12c.

In comparison, there remains a pinching gap 8 between the lower die half 2 and the slide 3a, 3b, 3c (the non-visible zone of the component 4a, 4b, 4c) which defines the pinched region 6 of the component 4a, 4b, 4c, and through which a non-illustrated waste slug, produced during the blow molding process and detached after the blow molding operation, can be discharged.

In operation, after blow molding with the decorative material 5 having a projecting end 5a, the two die halves 1 and 2 are moved apart and the slide 3 is retracted. The projecting end 5a of the decorative material is subsequently folded around the side edge 12a, 12b, 12c of the component 4a, 4b, 4c and connected to the component 4a, 4b, 4c by adhesive bonding or other suitable fixing methods.

According to FIG. 1, a decorative material 5, 9 is provided on both sides of the component 4a. The upper side of the slide 3a is aligned with the upper wall of the component 4a or the decorative material 5. The decorative material 9 on the lower wall of the component 4a is placed up to the pinched region 6 or the pinching gap 8. After the component 4a is removed from the die 1, 2, the projecting end 5a of the decorative material 5 is folded around the region left free from decorative material during the blow molding operation. Alternatively, the two ends of the decorative material 5, 9 can be countersunk in a groove 14 in the component 4a. The groove 14 shown in FIG. 1 is not drawn to scale. The groove 14 can merely indent the outer surface of the component 4a and need not extend past the inner surface of the component 4a (as shown).

In FIG. 2, the slide 3b of the two die halves 1, 2 is configured such that the upper wall of the component 4b and the upper face of the slide 3b are not in alignment. Therefore, the decorative material 5 is partially laid onto the side edge 12b of the component 4b even during the blow molding operation.

In a further non-illustrated version of the embodiment of FIG. 2, the decorative material 5 may lie completely on the component 4 during the blowing operation and be pinched off in the pinched region 6 of the component 4b, the pinched region 6 being placed outside the visible region of the component 4b. If the decorative material is placed on both sides (as shown in FIG. 1), the pinched region 6, together with the slide 3b, may be placed such that the two ends of the decorative material 5, 9 butt flush on one another or are countersunk in a groove 14 (see FIG. 1) in the component 4a, 4b, 4c.

Finally, the FIG. 3 embodiment shows the inner contour of the two die halves 1, 2 configured such that the upper and lower walls of the component 4c are pressed together at the side edge 12c to form a one-piece wall 10 having a concealed edge 10'. A rounded edge contour 12c is produced on the wall 10 by the end face 11c of the slide 3c. The projecting end 5a of the decorative material 5 is placed around the concealed edge 10' to provide a visually attractive appearance for the coated component 4c.

The invention is not restricted to the preceding exemplary embodiments. Further modifications of the pinching gap transfer by an appropriate die configuration may be envisaged within the scope of the basic concept of the invention.

I claim:

1. A method for the blow molded production of double-walled components coated with a decorative material, which comprises:

pressing, by blown air in a blow molding die having a die separation region formed between two die halves, a freshly extruded plastic tube together with a decorative material into a component having a shape corresponding to a die inner contour and a side edge, and creating a pinched region of the component at the die separation region;

placing the pinched region into a component wall portion adjoining the component at a distance from the side edge of the component, by displacing the die separation region; and connecting the decorative material to the component around the side edge.

2. The method according to claim 1, which comprises placing the pinched region at a component portion not visible when the component is in the installed state.

3. The method according to claim 1, wherein the placing step is performed by placing the pinched region with a slide movable in the die separation region.

4. The method according to claim 3, wherein the pressing step includes projecting an end of the decorative material beyond the side edge of the component, holding the end between a die half and the slide resting against the die half, and, after removing the slide from the die, laying the projecting end around the side edge of the component and connecting the projecting end to the component.

5. The method according to claim 4, wherein the pressing step includes integrally forming the projecting end of the decorative material onto a part of the side edge of the component.

6. The method according to claim 4, wherein the laying step is performed by overlapping a folded-round end of the decorative material onto the pinched region, and further comprises securing a second decorative material to the pinched region of the component.

7. The method according to claim 4, wherein the laying step is performed by overlapping a folded-round end of the decorative material onto the pinched region, and further comprises detaching a second decorative material at the butting point.

8. The method according to claim 4, wherein the laying step is performed by overlapping a folded-round end of the decorative material onto the pinched region, and further comprises detaching a second decorative material at the pinched region.

9. The method according to claim 4, which comprises pressing the side edge of the component between the two die halves to form a wall portion having a concealed edge, and, after removing the component from the die, folding the projecting end of the decorative material around the wall portion, and securing the decorative material to the wall portion at the concealed edge.

10. The method according to claim 1, which-comprises integrally forming the decorative material to the pinched region.

11. The method according to claim 1, which comprises pinching off the decorative material at the pinched region.

12. The method according to claim 1, which comprises countersinking the decorative material in a groove of the component wall.

13. The method according to claim 1, which comprises cutting off the decorative material flush with the side edge of the component.

14. The method according to claim 1, which comprises cutting off the decorative material flush with an edge of a further decorative surface on the component.

* * * * *

UNITED STATES PATENT AND TRADEMARK OFFICE
CERTIFICATE OF CORRECTION

PATENT NO. : 6,517,766 B1
DATED : February 11, 2003
INVENTOR(S) : Werner Wrobbel It is certified that error appears in the above-identified patent and that said Letters Patent is hereby corrected as shown below:

<u>Title page,</u>
Item [30], should read as follows:
-- Foreign Application Priority Data
Dec. 24, 1998     [DE]     ……… 198 60 199.9 --

Signed and Sealed this

Third Day of June, 2003

JAMES E. ROGAN
*Director of the United States Patent and Trademark Office*